United States Patent [19]
Bildstein et al.

[11] 3,939,233
[45] Feb. 17, 1976

[54] METHOD FOR THE PRODUCTION OF SPHERICAL PARTICLES

[75] Inventors: Hubert Bildstein, Vienna; Karl Knotik, Siegendorf; Peter Leichter, Vienna, all of Austria

[73] Assignee: HOBEG Hochtemperaturreaktor-Brennelement GmbH, Grossauheim, Germany

[22] Filed: Nov. 17, 1972

[21] Appl. No.: 307,561

[30] Foreign Application Priority Data
Nov. 18, 1971 Austria ............................... 9980/71

[52] U.S. Cl. ............................................... 264/13
[51] Int. Cl. ............................................. B01j 2/06
[58] Field of Search ...................... 264/13, 14, 5, 7

[56] References Cited
UNITED STATES PATENTS 3,290,122  12/1966  Clinton et al. ...................... 264/14
3,384,687  5/1968  Flack ..................................... 264/13
3,535,264  10/1970  Hackstein ............................ 264/13

*Primary Examiner*—Robert F. White
*Assistant Examiner*—J. R. Hall
*Attorney, Agent, or Firm*—Ernest G. Montague; Karl F. Ross; Herbert Dubno

[57] ABSTRACT

A method for the production of spherical particles. The starting material for the particles and organic substances are used to form a liquid aqueous mix from which drops are formed. The starting material is introduced into an aqueous solution in the form of a fine powder. The solution contains condensable or curable organic substances. As the starting material a non-metal, metalloid or a compound of one of these is used.

4 Claims, 1 Drawing Figure

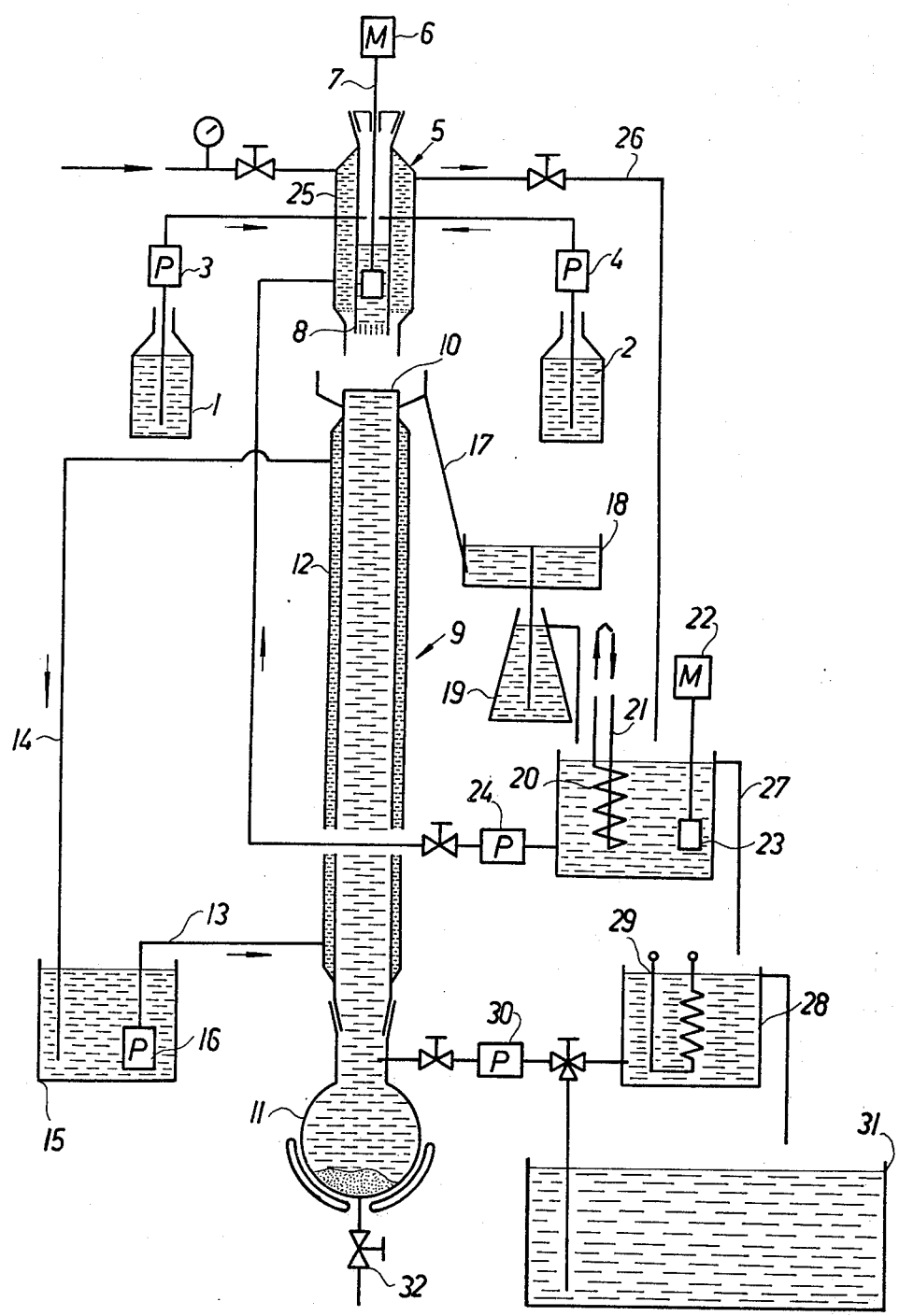

METHOD FOR THE PRODUCTION OF SPHERICAL PARTICLES

The invention relates to a method for the production of spherical particles, using the starting material of the particles and organic substances to form a liquid, aqueous mix, spraying this mix or allowing it to drain off to form drops which are solidified during their downward passage through a column.

The hitherto-known methods for the production of spherical particles have been mainly developed for the production of same from metals and metal compounds.

In accordance with the invention the starting materials are ground to a fine powder and this powder is then introduced into an aqueous solution containing condensable or curable organic substances; a suspension is formed by stirring. To the resulting suspension catalysts and cross-linking agents can be added. By the method of the invention it is possible to produce particles of a neutron-absorbing material or a reaction moderating material.

For producing the carbon matrix of the particles, the known condensation reaction of phenols and aldehydes can be utilized. The utilization of resorcinol and/or urea has been proved to be advantageous. Resorcinal has very good solubility in water and is especially reactive on account of its OH-groups in meta-position. For the condensation agent formaldehyde solution or glyoxalic solution is used. It is also possible to use acetaldehyde, propionaldehyde, furfural or a mixture of formaldehyde and furfural. For a complete condensation of 1 mol resorcinal about 1.7 mol formaldehyde are needed. To guarantee reaction completion and to obtain homogenous reaction products, it is desirable to use a ratio of 1 : 1.2 to 1.4.

For adjusting the reaction time of the curing process necessary for the method, catalysts have to be added to the mixture to regulate the initiation of the polycondensation which follows an ionic reaction mechanism.

In accordance with the invention, carboxylic acids and sulfonic acids especially toluene sulfonic acids, cyclohexane sulfamic acid, mellitic acid, and pyromellitic acid have been found suitable; by the addition of the two last-mentioned acids an advantageous three-dimensional linking of the resin is effected.

On account of the special utilization of the particles the desired fillers, like graphite, soot, boron, boron oxide, boron carbide, silicon, silicon carbide are added to the mixture in form of highly ground powders and are mixed to a suspension by thorough stirring. Preferably the aldehyde is mixed with to the suspension mixture immediately before the droplets are formed in a jet.

For ensuring complete condensation of the droplets the oil is heated to about 80° to 100°C. At this temperature it is possible to convert the droplets of the mixture to firm particles during their sinking in a column of a height of about 2 to 3 m filled with oil. By fixing the diameter of the jet, the grain size of the powder and by adjusting the pressure, temperature, viscosity and surface tension in the mixture, particles having a determined size and a good uniformity can be produced.

After having been cured, the particles are washed free from oil, dried and heated to 600°C to carbonize the resin.

In a further step the carbon matrix is graphitized at a temperature from 1800° to 2600°C; where boron or silicon is present the same is converted to the carbide. The resulting graphitized particles are flawless and extremely fine pored. Particles containing boron carbide, according to the invention, are in the form of coated particles, i.e. particles which have been covered by a gas impermeable layer of pyrocarbon or pyrocarbon and silicon carbide, which is especially suitable for the production of absorber elements for gas-cooled high temperature reactors.

The inventive method is, of course, also suitable for the production of spherical particles from carbon and metal compounds.

Example 1

For the production of boron-carbide-containing carbon particles, the suspension mix contains the necessary components, for instance in the following composition:

| | |
|---|---|
| Water | 1000 g |
| resorcinal | 375 g |
| mellitic acid | 5 g |
| cyclohexane sulfamic acid | 40 g |
| boron (amorphous) | 45 g |

For curing agent 400 ml formaldehyde 40 % are added.

Example 2

As example for carbon particles the following mix is given:

| | |
|---|---|
| Water | 1000 g |
| resorcinal | 410 g |
| cane-sugar | 25 g |
| pyromellitic acid | 5 g |
| toluene sulfonic acid | 35 g |
| soot or graphite powder | 40 g |

425 ml formaldehyde 40 % are added as curing agent.

In the drawing an apparatus for producing the particles is shown.

A container 1 for the suspension mixture and a container 2 for the curing agent are connected to a jet (mixing) vessel 5 by way of a proportioning pump 3 or 4. The contents of the vessel 5 are thoroughly stirred by an agitator 7 driven by a motor 6. The mixture in vessel 5 is forced through to the jet openings 8 into a receiving vessel 9. Droplets are thus formed which sink in a tube 10 being filled with paraffine oil, solidify and are collected in a vessel 11 attached to the end of the tube.

Besides oil also other liquides can be used such as organic solvents. The liquids can also contain dissolved amines or dissolved $NH_3$. In the drawing the receiving tube column 10 is surrounded by a jacket 12 through which a heating medium is passed and which is provided with conduits 13, 14. The conduits 13, 14 discharge into a collecting tank 15, the circulation being ensured by a pump 16 with a thermostat.

The diameter of the jet can for instance be between 0.2 and 0.7 mm. A height of drop of about 800 mm has proved sufficient for the particles ejected. The oil level is kept constant by the continous supply of oil and an overflow tube 17. The overflow 17 is connected to a separator 18 which passes the oil to a second separator 19. From there the oil is passed to a container 20 where a cooling device 21 and an agitator 23 are provided. The agitator is driven by a motor 22. The cooled oil is moved by a pump 24 into the cooling jacket 25 of the jet (mixing) vessel 5, from here it is returned into the container 20 by way of a conduit 26. The container 20 is connected to a further container 28 by way of an overflow 27; the container 28 contains a heating device 29. A pump 30 brings the heated oil into the receiving tube 10. A storage tank 31 serves for equalizing the oil level in the individual containers.

The collecting vessel 11 for the particles produced has an outlet 32 through which the particles can be removed from time to time. After they have been removed from the collecting vessel the cured particles are washed free from oil, are dried at 100°C and are screened. The screened particles are put into a graphite crucible and heated in an inert atmosphere ($N_2$-gas) to 600°C, during which step the resin and the carbon containing additives are carbonized.

Then the particles in the graphite crucible are sintered in an inductively heated high temperature furnace at 2000°C converting any boron and silicon respectively to boron or silicon carbide.

In the production of graphite-carbon-particles the charges are graphitized at 2500°C to 2800°C. The size of the particles is determined by a number of factors, like pressure, shape of the jet, distance of the jet from the surface of the receiving liquid, temperature, density, viscosity and surface tension of the used mixture, ability of wetting and grain size of the used powder, temperature, density, viscosity and surface tension of the receiving liquid.

Temperature, density and viscosity can be kept constant without difficulties. The shape of the jet and the distance from the surface of the liquid are not altered and are therefore also constant. However the surface tension is subjected to considerable fluctuation which can be removed if a tenside is added in a concentration being not too low. Thereby the surface tension is kept at very low value which remains constant to a large extent on account of the surplus of the tenside. The concentration of the tenside should be according to the effectivity 0.5 to 2 g/l.

What we claim is:

1. A method of producing spherical solid particles comprising the steps of:

a. suspending solid grains of at least one powdered substance selected from the group which consists of graphite, soot, boron oxide, amorphous boron, boron carbide, amorphous silicon, silicon oxide and silicon carbide in an aqueous solution of at least two mutually condensable organic compounds capable of forming upon curing at an elevated temperature a synthetic resin, one of said compounds being selected from the group which consists of resorcinol and urea, the other of said compounds being an aldehyde condensable with said one of said compounds;

b. forming droplets of the suspension of said grains of said powdered substance in said solution;

c. passing said droplets downwardly through a column of a liquid immiscible with said solution and at a temperature of substantially 80° to 100°C and sufficient to induce condensation of said compounds to form said synthetic resin and to cure the resulting synthetic resin, thereby forming particles in which said grains are distributed in a synthetic resin matrix;

d. separating the latter particles from said liquid; and e. heating the particles separated in step (d) to a temperature of substantially 1800° to 2600°C to carbonize said synthetic resin and form graphite and carbides in the heated particles from the carbon formed on carbonization of said synthetic resin.

2. The method defined in claim 1 wherein said compounds are resorcinol and formaldehyde, said solution further comprising at least one accelerating substance selected from the group which consists of carboxylic and sulfonic acids.

3. The method defined in claim 2 wherein said acids are selected from the group which consists of toluene sulfonic acid cyclohexane sulfamic acid, mellitic acid and pyromellitic acid.

4. The method defined in claim 2 wherein the formaldehyde is added to said solution immediately prior to the formation of said droplets.

* * * * *